US009490946B2

(12) United States Patent
Bai et al.

(10) Patent No.: US 9,490,946 B2
(45) Date of Patent: Nov. 8, 2016

(54) INTERFERENCE COORDINATION METHOD AND BASE STATION

(71) Applicant: Huawei Technologies Co., LTD, Shenzhen (CN)

(72) Inventors: Wei Bai, Beijing (CN); Zheng Yu, Beijing (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 204 days.

(21) Appl. No.: 14/109,536

(22) Filed: Dec. 17, 2013

(65) Prior Publication Data

US 2014/0106769 A1   Apr. 17, 2014

Related U.S. Application Data

(63) Continuation of application No. PCT/CN2012/077052, filed on Jun. 16, 2012.

(30) Foreign Application Priority Data

Jun. 17, 2011  (CN) .......................... 2011 1 0163703

(51) Int. Cl.
*H04B 1/00* (2006.01)
*H04L 5/00* (2006.01)
(Continued)

(52) U.S. Cl.
CPC .......... *H04L 5/0032* (2013.01); *H04J 11/0053* (2013.01); *H04W 52/243* (2013.01); *H04W 52/244* (2013.01); *H04W 52/38* (2013.01)

(58) Field of Classification Search
CPC .... H04B 1/00; H04W 36/00; H04W 52/367; H04W 52/243–52/244
USPC ...................................................... 455/63.1
See application file for complete search history.

(56) References Cited

U.S. PATENT DOCUMENTS

2009/0042593 A1   2/2009 Yavuz et al.
2009/0197588 A1   8/2009 Khandekar et al.
(Continued)

FOREIGN PATENT DOCUMENTS

CN   101359938 A   2/2009
CN   101369831 A   2/2009
(Continued)

OTHER PUBLICATIONS

"Interference Avoidance and Interference Mitigation for Femto ABS," IEEE 802.16 Broadband Wireless Access Working Group, Dec. 2010, 4 pages.
(Continued)

*Primary Examiner* — Huy C Ho
(74) *Attorney, Agent, or Firm* — Slater Matsil, LLP

(57) ABSTRACT

Embodiments of the present invention provide an interference coordination method and a base station. The method includes determining interfering cell base stations and interference levels of the interfering cell base stations and receiving power coordination information sent by the interfering cell base stations. The power coordination information is used to indicate a power headroom of an interfering cell base station on a specific channel resource or indicate a minimum transmit power of an interfering cell base station on a specific channel resource. A base station requiring interference coordination among the interfering cell base stations is determined according to the interference levels and power coordination information of the interfering cell base stations. A power adjustment request is sent to the base station requiring interference coordination so that the base station requiring interference coordination adjusts a transmit power on the specific channel resource.

12 Claims, 9 Drawing Sheets

(51) Int. Cl.
*H04J 11/00* (2006.01)
*H04W 52/24* (2009.01)
*H04W 72/00* (2009.01)
*H04W 52/38* (2009.01)

(56) References Cited

U.S. PATENT DOCUMENTS

| | | | |
|---|---|---|---|
| 2010/0173612 A1* | 7/2010 | Khanfouci | H04W 16/16 455/412.1 |
| 2010/0323745 A1 | 12/2010 | Chen et al. | |
| 2011/0117967 A1* | 5/2011 | Vedantham | H04B 7/024 455/561 |
| 2012/0113843 A1* | 5/2012 | Watfa | H04W 72/1289 370/252 |

FOREIGN PATENT DOCUMENTS

| | | |
|---|---|---|
| CN | 101662775 A | 3/2010 |
| CN | 102026207 A | 4/2011 |
| CN | 102065490 A | 1/2014 |
| WO | 2007044281 A1 | 4/2007 |

OTHER PUBLICATIONS

Extended European Search Report received in Application No. 12800587.3-1855 mailed Mar. 6, 2014, 9 pages.

International Search Report and Written Opinion received in Application No. PCT/CN2012/077052 mailed Sep. 27, 2012, 12 pages.

ZTE, "PHR Trigger in Additional Power Backoff," 3GPP TSG RAN WG2 #73bis, R2-111901, Shanghai, China, Apr. 11-15, 2011, 2 pages.

Yeh, et al., "Power Control Based Interference Mitigation in Multi-tier Networks," IEEE Globecom 2010 Workshop on Femtocell Networks, Dec. 2010, 6 pages.

* cited by examiner

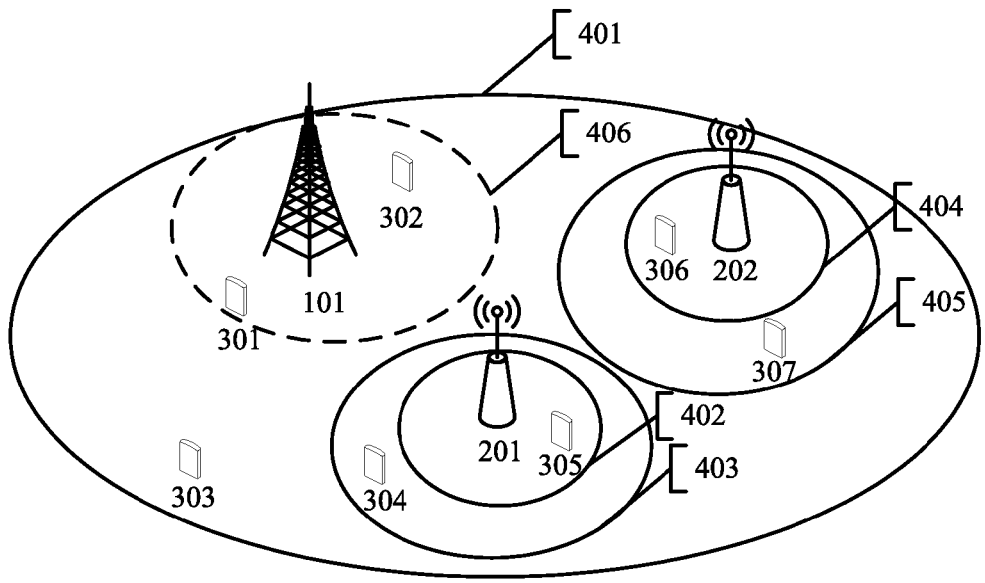

FIG. 1

```
┌─────────────────────────────────────────────────────────────┐
│ Determine interfering cell base stations and interference   │
│ levels of the interfering cell base stations, and receive   │ 21
│ power coordination information sent by the interfering      │
│ cell base stations                                          │
└─────────────────────────────────────────────────────────────┘
                              │
                              ▼
┌─────────────────────────────────────────────────────────────┐
│ Determine, according to the interference levels and power   │
│ coordination information of the interfering cell base       │ 22
│ stations, a base station requiring interference coordination│
│ among the interfering cell base stations                    │
└─────────────────────────────────────────────────────────────┘
                              │
                              ▼
┌─────────────────────────────────────────────────────────────┐
│ Send a power adjustment request to the base station         │
│ requiring interference coordination so that the base station│ 23
│ requiring interference coordination adjusts a transmit      │
│ power on a specific channel resource                        │
└─────────────────────────────────────────────────────────────┘
```

FIG. 2

| 1201 | A second base station receives power coordination information sent by a first base station, where the power coordination information is generated by the first base station according to a power headroom, reported by a user equipment of the first base station, on a specific channel resource, and includes the power headroom or includes the power headroom and resource indication information of the specific channel resource, and a user equipment of the second base station causes interference to the user equipment of the first base station on the specific channel resource |

| 1202 | The second base station adjusts a transmit power of the user equipment of the second base station on the specific channel resource according to the power coordination information |

FIG. 12

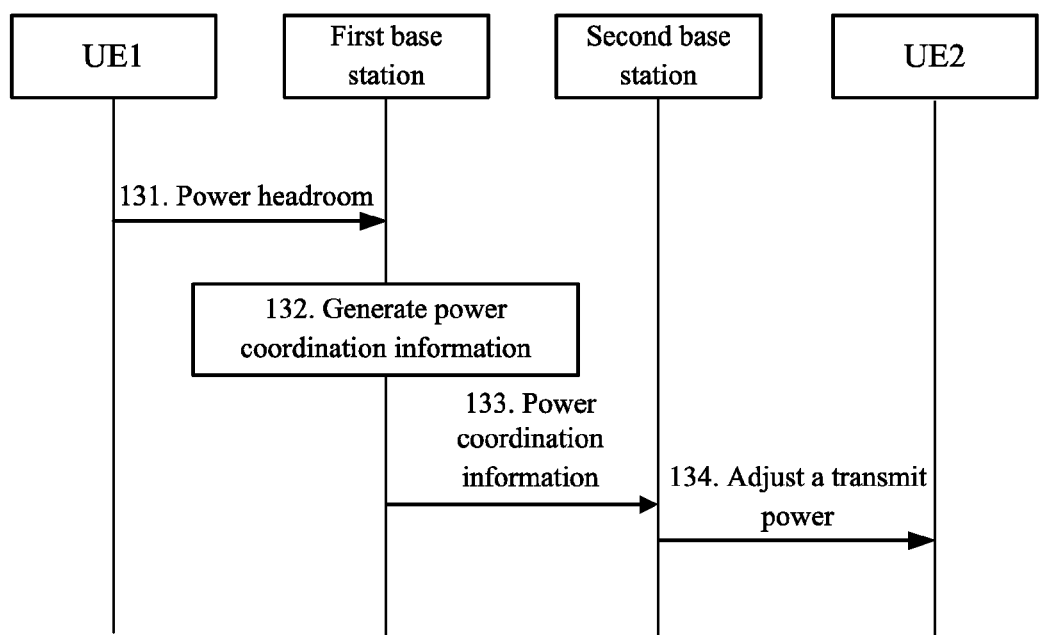

FIG. 13

INTERFERENCE COORDINATION METHOD AND BASE STATION

This application is a continuation of International Application No. PCT/CN2012/077052, filed on Jun. 16, 2012, which claims priority to Chinese Patent Application No. 201110163703.2, filed on Jun. 17, 2011, both of which are hereby incorporated by reference in their entireties.

TECHNICAL FIELD

Embodiments of the present invention relate to the radio communications field, and in particular embodiments, to an interference coordination method and a base station.

BACKGROUND

A radio communication system is capable of providing radio services such as voice and data. A common radio communication system is a multiple access wireless system, where a base station transmits data and/or control information to a user equipment UE (User Equipment) over a downlink, and receives data and/or control information of the user equipment over an uplink. Similarly, the user equipment transmits data and/or control information to the base station over the uplink, and receives data and/or control information transmitted by the base station over the downlink. The following takes an LTE (Long Term Evolution) and/or LTE-A (LTE-Advanced) radio communication system as an example for description.

In order to satisfy performance requirements for or to improve performance of LTE-A, different types or different modes of base stations, for example, a low-transmit-power base station (BS: Base Station) or transmit/receive node, a Micro BS (micro base station), a Pico BS (pico base station), a Home BS (home base station), a femto BS (femto base station), a Relay BS (relay base station), and an RRH (Remote radio head, remote radio head), may be deployed in a homogeneous network (homogeneous network), so as to enhance the coverage and performance of the network. Such a network structure is referred to as a heterogeneous network (Heterogeneous network). The following further describes an example of a heterogeneous network where a high-transmit-power base station (for example, a macro base station, or referred to as a Macro eNodeB or a MeNB) and a low-transmit-power base station (low power base station for short, lower power node, LPN) are deployed.

In order to improve frequency spectrum utilization efficiency for a system, full or partial frequency spectrum reuse is performed on uplink and/or downlink spectrum resources configurable for an LPN and uplink and/or downlink spectrum resources configurable for a MeNB. In this case, because the LPN is configured with the same or partially same spectrum resources as the MeNB, intra-channel or intra-frequency interference occurs on downlink channel or uplink channel transmission between the LPN (or a UE served by the LPN) and the MeNB (or a UE served by the MeNB). This interference affects reliability of downlink channel transmission and uplink channel detection of the LPN and the MeNB, where the channel includes a control channel and a data channel.

At present, in the LTE-A standard, a time division multiplexing TDM (TDM: Time Division Multiplexing) inter-cell interference coordination ICIC (Inter Cell Interference Coordination) method is employed to process inter-cell interference in a heterogeneous network scenario. An interfering cell base station (which may be a macro base station or an LPN base station) sets some specific channel resources to low transmit powers or sets them to transmit no service (that is, zero service transmit power). An example of such a specific channel resource is an almost blank subframe (ABS: Almost Blank subframe) resource. An affected cell base station (which may be an LPN base station or a macro base station) schedules a UE that receives strong interference from the interfering cell base station on a subframe corresponding to the ABS subframe configured by the interfering cell base station for service transmission, thereby ensuring transmission performance of the affected UE of the affected base station.

If transmit powers on the ABS subframe are not coordinated between the interfering cell base station and the affected cell base station, when the interfering cell base station sets a transmit power on the ABS subframe to be very low, it is possible that almost no UE can be scheduled by the interfering cell base station to perform service transmission on the ABS subframe, which reduces available transmission resources. In another aspect, if the interfering cell base station schedules the ABS subframe for a UE thereof to increase transmission resources, it is possible that a UE of the affected cell base station still receives strong interference because the transmit power on the ABS subframe is set improperly.

SUMMARY OF THE INVENTION

Embodiments of the present invention provide an interference coordination method and a base station, which can reduce interference between base stations.

In one aspect, an interference coordination method is provided, including: determining interfering cell base stations and interference levels of the interfering cell base stations, and receiving power coordination information sent by the interfering cell base stations, where the power coordination information is used to indicate a power headroom of an interfering cell base station on a specific channel resource or indicate a minimum transmit power of an interfering cell base station on a specific channel resource; determining, according to the interference levels and power coordination information of the interfering cell base stations, a base station requiring interference coordination among the interfering cell base stations; and sending a power adjustment request to the base station requiring interference coordination so that the base station requiring interference coordination adjusts a transmit power on the specific channel resource.

In another aspect, an interference coordination method is provided, including: sending power coordination information to a neighboring cell base station, where the power coordination information is used to indicate a power headroom of an interfering cell base station on a specific channel resource or indicate a minimum transmit power of an interfering cell base station on a specific channel resource; receiving a power adjustment request sent by the neighboring cell base station according to the power coordination information; and adjusting a transmit power on the specific channel resource according to the power adjustment request.

In another aspect, a method for sending a measurement report is provided, including: learning a current transmit power of an interfering cell base station of a user equipment on a specific channel resource, or a path loss for data transmission between the user equipment and the interfering cell base station; and sending a measurement report to a serving base station of the user equipment, where the measurement report carries the current transmit power on the specific channel resource, or the measurement report carries the path loss and a reference signal received power of the user equipment, so that the serving base station determines the current transmit power of the interfering cell base station of the user equipment according to the measurement report.

In another aspect, an interference coordination method is provided, including: receiving a power headroom, reported by a user equipment, of the user equipment on a specific channel resource; and sending power coordination information to a serving base station of an interfering user equipment, where the power coordination information includes the power headroom, or the power coordination information includes the power headroom and resource indication information of the specific channel resource, so that the serving base station adjusts a transmit power of the interfering user equipment on the specific channel resource according to the power coordination information.

In another aspect, an interference coordination method is provided, including: receiving, by a second base station, power coordination information sent by a first base station, where the power coordination information is generated by the first base station according to a power headroom, reported by a user equipment of the first base station, on a specific channel resource, and includes the power headroom or includes the power headroom and resource indication information of the specific channel resource, and a user equipment of the second base station causes interference to the user equipment of the first base station on the specific channel resource; and adjusting, by the second base station according to the power coordination information, a transmit power of the user equipment of the second base station on the specific channel resource.

In another aspect, a base station device is provided, including: an identifying unit, configured to determine interfering cell base stations and interference levels of the interfering cell base stations; a receiving unit, configured to receive power coordination information sent by the interfering cell base stations, where the power coordination information is used to indicate a power headroom of an interfering cell base station on a specific channel resource or indicate a minimum transmit power of an interfering cell base station on a specific channel resource; a determining unit, configured to determine, based on the interference levels of the interfering cell base stations determined by the identifying unit and the power coordination information received by the receiving unit, a base station requiring interference coordination among the interfering cell base stations; and a requesting unit, configured to send a power adjustment request to the base station requiring interference coordination determined by the determining unit, so that the base station requiring interference coordination adjusts a transmit power on the specific channel resource.

In another aspect, a base station is provided, including: a sending unit, configured to send power coordination information to a neighboring cell base station, where the power coordination information is used to indicate a power headroom of the base station on a specific channel resource or indicate a minimum transmit power of the base station on a specific channel resource; a receiving unit, configured to receive a power adjustment request sent by the neighboring cell base station according to the power coordination information; and an adjusting unit, configured to adjust a transmit power on the specific channel resource according to the power adjustment request received by the receiving unit.

In another aspect, a base station is provided, including: a receiving unit, configured to receive a power headroom, reported by a user equipment, of the user equipment on a specific channel resource; a generating unit, configured to generate power coordination information according to the power headroom received by the receiving unit, where the power coordination information includes the power headroom, or the power coordination information includes the power headroom and resource indication information of the specific channel resource; and a sending unit, configured to send the power coordination information generated by the generating unit to a serving base station of an interfering user equipment, so that the serving base station adjusts a transmit power of the interfering user equipment on the specific channel resource according to the power coordination information.

In another aspect, a base station is provided, including: a receiving unit, configured to receive power coordination information sent by a first base station, where the power coordination information is generated by the first base station according to a power headroom, reported by a user equipment served by the first base station, on a specific channel resource, and includes the power headroom or includes the power headroom and resource indication information of the specific channel resource, and a user equipment of the base station causes interference to the user equipment of the first base station on the specific channel resource; and an adjusting unit, configured to adjust, according to the power coordination information received by the receiving unit, a transmit power of the user equipment of the base station on the specific channel resource.

In another aspect, a user equipment is provided, including: a learning unit, configured to learn a current transmit power of an interfering cell base station of the user equipment on a specific channel resource, or a path loss for data transmission between the user equipment and the interfering cell base station; and a reporting unit, configured to send a measurement report to a serving base station of the user equipment, where the measurement report carries the current transmit power learned by the learning unit on the specific channel resource, or the measurement report carries the path loss learned by the learning unit and a reference signal received power of the user equipment, so that the serving base station determines the current transmit power of the interfering cell base station of the user equipment according to the measurement report.

In the embodiments of the present invention, an interfering cell base station sends power coordination information of a specific channel resource to an affected cell base station, and adjusts a transmit power on the specific channel resource based on an adjustment request generated by the affected cell base station based on the power coordination information, thereby reducing interference to the affected cell base station on the specific channel resource; and meanwhile, the interfering cell base station can still use the specific channel resource for service transmission, which increases system capacity.

BRIEF DESCRIPTION OF THE DRAWINGS

To illustrate the technical solutions in the embodiments of the present invention more clearly, the following briefly introduces the accompanying drawings required for describing the embodiments or the prior art. Apparently, the accompanying drawings in the following description show merely some embodiments of the present invention, and a person of ordinary skill in the art may still derive other drawings from these accompanying drawings without creative efforts.

FIG. 1 is a schematic diagram of an example of an inter-base station inference coordination scenario;

FIG. 2 is a flowchart of an interference coordination method according to an embodiment of the present invention;

FIG. 12 is a schematic flowchart of an interference coordination method according to another embodiment of the present invention;

FIG. 13 is a schematic flowchart of an interference coordination process according to another embodiment of the present invention;

DETAILED DESCRIPTION OF ILLUSTRATIVE EMBODIMENTS

Figure 3:
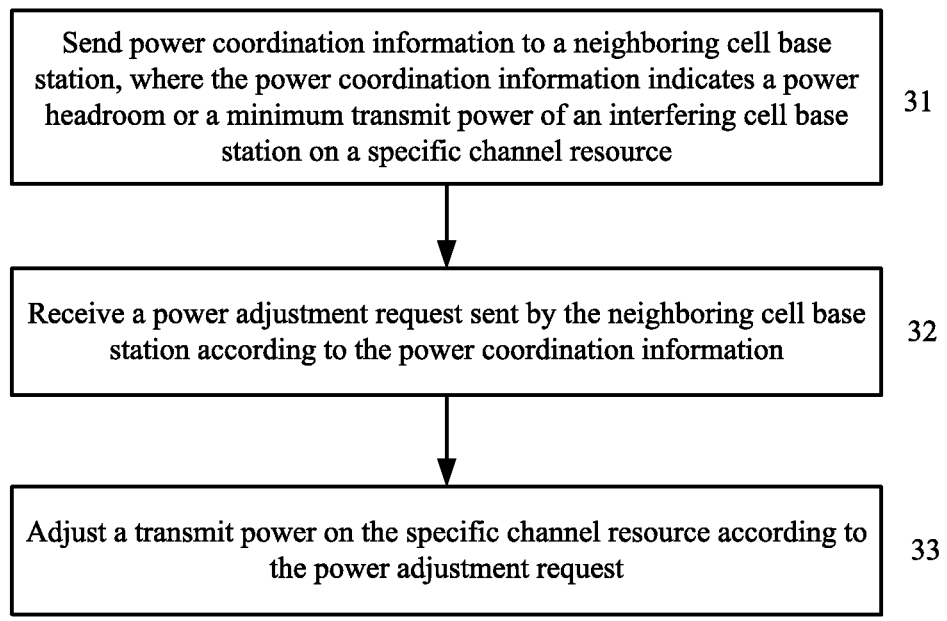
FIG. 3 is a flowchart of an interference coordination method according to another embodiment of the present invention.

The following clearly and completely describes the technical solutions in the embodiments of the present invention with reference to the accompanying drawings in the embodiments of the present invention. Apparently, the described embodiments are merely a part rather than all of the embodiments of the present invention. All other embodiments obtained by a person of ordinary skill in the art based on the embodiments of the present invention without creative efforts shall fall within the protection scope of the present invention.

The embodiments of the present invention are applicable to a radio communication system, and especially an LTE/LTE-A radio communication system. Specific embodiments of the present invention are described hereinafter through an example where the present invention is applied to an LTE/LTE-A radio communication system. However, the embodiments of the present invention are not limited to this specific radio communication system. It should be noted that, provided that no ambiguity is caused, the concept of a base station is equivalent to that of a cell.

In a heterogeneous network, when a TDM ICIC method is employed to process inter-cell interference in a heterogeneous network scenario, if an interfering base station schedules a specific channel resource (for example, an ABS resource) to a UE thereof, transmission resources can be increased.

FIG. 1 is a schematic diagram of an example of an inter-base station inference coordination scenario. FIG. 1 exemplifies a schematic diagram where TDM ICIC is performed on a Macro eNB and Pico eNBs within a coverage range of the macro eNB. If interference protection of the Macro eNB for the Pico eNB is considered, the Macro eNB may set some subframes to ABS subframes. As shown in FIG. 1, 101 represents a macro base station; 201 and 202 represent low-power base stations (for example, Pico eNBs); 301 to 307 represent user equipments; and 401 to 405 represent coverage ranges of base stations, where 401 represents a coverage range of 101 on non-ABS subframes, 402 represents a coverage range of 201 on subframes corresponding to non-ABS subframes of the Macro eNB; 404 represents a coverage range of 202 on subframes corresponding to the non-ABS subframes of the Macro eNB; 403 represents a coverage range of 201 on subframes corresponding to the ABS subframes of the Macro eNB, and 405 represents a coverage range of 202 on subframes corresponding to the ABS subframes of the macro eNB. In FIG. 1, because 101 has a high transmit power, transmission performed by 101 may cause interference to 201 and 202. In order to reduce the interference to 201 and 202, 101 sets some subframes to ABSs and 101 does not schedule a service on the ABSs (that is, a data transmit power on the ABSs is 0). Therefore, 101 can schedule data for UEs 301 to 303 of 101 on only non-ABS subframes.

In order to further increase capacity and resource utilization efficiency of the network, 101 may set a proper transmit power on an ABS, so that transmission performed by 101 on the ABS does not cause serious interference to 201 and 202. As shown by the dashed box in FIG. 1, 406 is a coverage range of the base station 101 on an ABS. Transmission performed by 101 on the ABS causes no interference to the transmission performed by 201 and 202 (or reception performed by 304 and 307). Therefore, the base station 101 may schedule user equipments 301 and 302 to perform service transmission on the ABS, thereby increasing system capacity.

As can be seen from FIG. 1, if an interfering cell base station (for example, the base station 101) sets a proper power on the ABS, the interfering cell base station can still use the ABS for service transmission for UEs thereof while reducing interference to an affected cell base station, thereby increasing system capacity.

However, in this case, it is possible that the affected cell base station still receives strong interference because the transmit power on the ABS is set improperly. For example, if the ABS coverage range 406 of the base station 101 is too large (that is, the transmit power set on the ABS is too high), a user equipment within the ABS coverage range 403 of 201 or the ABS coverage range 405 of the base station 202 may receive interference. Therefore, the interfering cell base station, when setting the transmit power on the ABS subframe, needs to consider locations and the number of affected cell base stations or affected UEs around the interfering cell base station, and then properly sets the coverage range on the ABS subframe while ensuring system capacity and service requirements of UEs served by the interfering cell base station, to reduce the interference caused by the interfering cell base station to the affected cell base stations or the affected UEs.

An embodiment of the present invention, with respect to the foregoing application scenario, discloses a method for coordinating inter-base station interference, to ensure that the interfering cell base station sets a proper transmit power on the ABS, to reduce interference to the affected cell base station while allowing the interfering cell base station to perform service transmission on the ABS, thereby increasing system capacity.

FIG. 2 is a flowchart of an interference coordination method according to an embodiment of the present invention. The method in FIG. 2 is executed by an affected cell base station.

21. Determine interfering cell base stations and interference levels of the interfering cell base stations, and receive power coordination information sent by the interfering cell base stations, where the power coordination information is used to indicate a power headroom of an interfering cell base station on a specific channel resource or indicate a minimum transmit power of an interfering cell base station on a specific channel resource.

22. Determine, according to the interference levels and power coordination information of the interfering cell base stations, a base station requiring interference coordination among the interfering cell base stations.

23. Send a power adjustment request to the base station requiring interference coordination so that the base station requiring interference coordination adjusts a transmit power on the specific channel resource.

In the embodiment of the present invention, an interfering cell base station sends power coordination information of a specific channel resource to an affected cell base station, and adjusts a transmit power on the specific channel resource based on an adjustment request generated by the affected cell base station based on the power coordination information, thereby reducing interference to the affected cell base station on the specific channel resource; and meanwhile, the interfering cell base station can still use the specific channel resource for service transmission, which increases system capacity.

FIG. 3 is a flowchart of an interference coordination method according to another embodiment of the present invention. The method in FIG. 3 is executed by an interfering cell base station.

31. Send power coordination information to a neighboring cell base station, where the power coordination information is used to indicate a power headroom of an interfering cell base station on a specific channel resource or a minimum transmit power of the interfering cell base station on a specific channel resource.

32. Receive a power adjustment request sent by the neighboring cell base station according to the power coordination information.

33. Adjust a transmit power on the specific channel resource according to the power adjustment request.

In the embodiment of the present invention, an interfering cell base station sends power coordination information of a specific channel resource to an affected cell base station, and adjusts a transmit power on the specific channel resource based on an adjustment request generated by the affected cell base station based on the power coordination information, thereby reducing interference to the affected cell base station on the specific channel resource; and meanwhile, the interfering cell base station can still use the specific channel resource for service transmission, which increases system capacity.

The embodiments of the present invention are described hereinafter in further detail with reference to specific examples. It should be noted that in the following embodiments of the present invention, power coordination between base stations is performed with respect to a transmit power on an ABS resource (which is an example of a specific channel resource). A granularity used for the ABS resource may be a total frequency band on the ABS subframe. In an actual system, in order to achieve a finer power coordination result, the embodiments of the present invention may similarly be applied to a finer power coordination granularity. For example, a transmit power on a frequency domain subcarrier occupied by the ABS resource, on a frequency domain physical resource block occupied by the ABS resource, or on a frequency domain resource block group occupied by the ABS resource, may be adjusted. For example, one or more physical resource blocks may be used as the granularity of power coordination.

In addition, the specific channel resource in the embodiments of the present invention is not limited to the ABS resource described below, and may also be applied to channel resources of other types, for example, a flexible subframe (flexible subframe) resource. The subframe type of a flexible subframe is changeable, and a flexible subframe may be used as an uplink subframe within one period of time while as a downlink subframe within another period of time.

Figure 4:
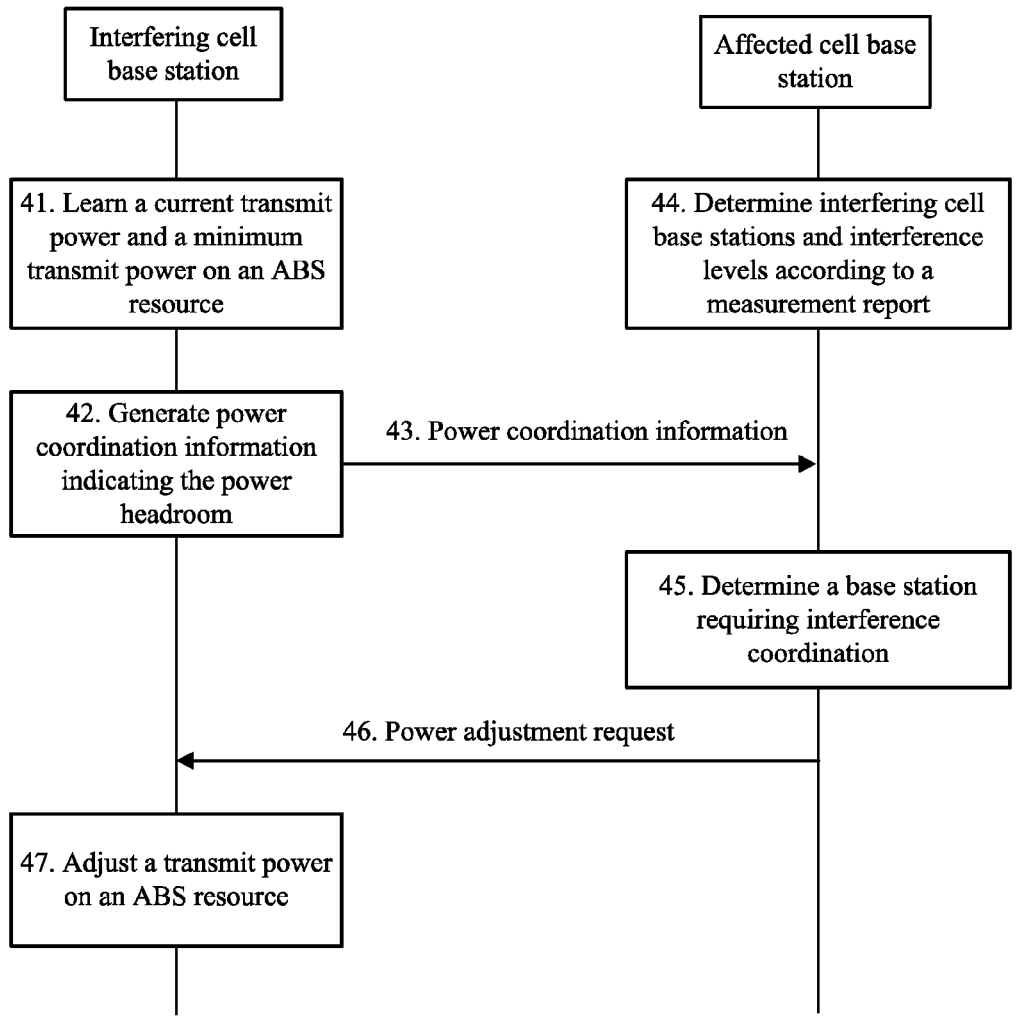
FIG. 4 is a schematic flowchart of an interference adjustment process according to an embodiment of the present invention.

FIG. 4 is a schematic flowchart of an interference adjustment process according to an embodiment of the present invention. In the embodiment in FIG. 4, power coordination information is used to indicate a power headroom of an interfering cell base station on a specific channel resource. In this case, the power headroom of the interfering cell base station on the specific channel resource includes a difference between a current transmit power and a minimum transmit power of the interfering cell base station on the specific channel resource.

The minimum transmit power may be configured by a network for the base station. Further, a value of the minimum transmit power may be determined according to system network planning.

41. An interfering cell base station learns a current transmit power and a minimum transmit power on an ABS resource.

In order to protect service requirements of UEs served by an interfering cell base station and the capacity of the network system from being greatly affected by a setting on the ABS resource, the interfering cell base station may set a minimum transmit power Power_min decibels (dB) on the ABS resource. The minimum transmit power of the interfering cell base station generally is a value determined at a network planning or network optimization stage, and is configured by the network for the base station. For example, the minimum transmit power may be set according to different coverage ranges of the interfering cell base station and an affected cell base station on different subframe types (ABS resource or non-ABS resource) and a link budget (Link Budget). In addition, the interfering cell base station may also semi-statically adjust the setting of the minimum transmit power on the ABS resource by using a self-organizing network (Self-organizing Network) or self-optimizing network (Self-optimizing Network) mechanism.

42. The interfering cell base station obtains a difference between the current transmit power and the minimum transmit power on the ABS resource, which is an example of power headroom.

Assuming that the current transmit power of the interfering cell base station on the ABS resource is Power_c decibels (dB), a range of the power headroom (or referred to as the power adjustment range) is:

Power adjustment range=Power_c−Power_min

The power adjustment range information may indicate the power adjustment range of the interfering cell base station by bit indication. For example, assuming that a maximum transmit power of the interfering cell base station on the ABS subframe is Power_max decibels (dB), a range of a maximum power adjustment range is:

Maximum power adjustment range=Power_max−Power_min

If one decibel is used as a step (Step) of indication, Ceil(Log 2(the maximum power adjustment range)) bits may be used to indicate the power adjustment range. Generally speaking, if the indication step of the power adjustment range is A decibels, Ceil(Log 2(the maximum power adjustment range/A)) bits are required to indicate the power adjustment range. Here, Ceil(x) indicates rounding up on x.

Another method used to indicate the power adjustment range is that, the power adjustment range information includes two indication fields, IE1 and IE2, where IE1 is used to indicate a specific value of the indication step, and IE2 is used to indicate a specific value within an indication range. The value of the power adjustment range is IE1×IE2.

43. The interfering cell base station sends the power headroom (or referred to as the power adjustment range) to an affected cell base station.

The interfering cell base station sends the power adjustment range to surrounding neighboring cell base stations or neighboring affected cell base stations periodically or in an event-triggered manner.

The interfering cell base station transmits the power adjustment range information (the bit field used to indicate the power adjustment range, and/or the field used to indicate the indication step of the power adjustment range) to a neighboring cell base station over an interface such as an X2 interface, an S1 interface, or an air interface. For example, in an LTE/LTE-A system, the interfering cell base station may send Load indication (load indication) information to an affected cell base station, where the power adjustment range information is carried in the Load indication information.

For example, the power adjustment range information on the ABS resource, namely, ABS Power Adjustment Range Info, may be included in an information element (IE: Information Element) called ABS information in the Load indication.

Alternatively, the power adjustment range information on the ABS resource, namely, ABS Power Adjustment Range Info, may be included in an IE called Load indication.

44. The affected cell base station learns interfering cell base stations and interference levels of the interfering cell base stations.

The affected cell base station may measure by itself the interfering cell base stations and the interference levels thereof. Alternatively, the affected cell base station may learn the interfering cell base stations and the interference levels thereof according to a measurement report reported by a user equipment, where the UE of the affected cell base station reports reference signal received powers (RSRP: Reference signal reception power) and/or reference signal received qualities (RSRQ: Reference signal reception quality) of neighboring cells, which are obtained by measurement. The affected cell base station determines which neighboring base stations are interfering cell base stations according to values (or a distribution) of RSRPs and/or RSRQs reported by the UE served by the affected cell base station. Further, it may determine which neighboring base stations cause strong interference to edge UEs of the affected cell base station (where an edge UE may refer to a UE that is geographically located at an edge of cell coverage, or refer to a UE whose signal quality is in a low section in signal quality distribution of all UEs in the cell) and which neighboring base stations cause weak interference to edge UEs of the affected cell base station, so that the affected cell base station identifies the interference levels of the interfering cell base stations (for example, strong-interference base stations and weak-interference base stations).

It should be noted that the executing sequence of step 44 and steps 41-43 does not constitute a limit on the embodiment of the present invention. Step 44 may be executed after steps 41-43, be executed before steps 41-43, or be executed, as shown in FIG. 4, simultaneously with steps 41-43. These variations shall all fall within the scope of the embodiment of the present invention.

45. The affected cell base station determines a base station requiring interference coordination according to the power coordination information (where in this example, the power coordination information is the power adjustment range information) received in step 43 and the interference levels of the interfering cell base stations determined in step 44.

As described in step 44, the affected cell base station may identify strong-interference base stations and weak-interference base stations according to the RSRP and/or RSRQ values (or distribution) reported by the UE served by the affected cell base station. Further, the affected cell base station may learn power adjustment ranges of neighboring base stations according to power adjustment range information on the ABS resource notified by the neighboring base stations. The affected cell base station sorts the interfering cell base stations according to the interference levels of the interfering cell base stations (for example, information on strong-interference base stations and weak-interference base stations) and the learned power adjustment range information of the neighboring base stations (that is, the power headrooms of the interfering cell base stations), and determines the base station requiring interference coordination according to a sorting result. For example, the affected cell base station may preferentially send a power adjustment request to an interfering cell base station with a highest priority according to a descending order of priorities. If performance of an edge UE of the affected cell base station still cannot satisfy the requirement of reliable reception when the interfering cell base station with the highest priority has reduced its transmit power on the ABS resource to the minimum transmit power, the affected cell base station may, continue to send a power adjustment request to an interfering cell base station with a next highest priority according to the descending order. Definitely, the interfering cell base station may also determine another rule for sending the power adjustment request, for example, simultaneously sending power adjustment requests to several interfering cell base stations with high priorities.

The sorting rule may be that: a strong-interference base station whose power adjustment range is wide has a highest priority; a strong-interference base station whose power adjustment range is medium has a medium priority; a strong-interference base station whose power adjustment range is narrow has a low priority; a weak-interference base station whose power adjustment range is wide has a lower priority; and a weak-interference base station whose power adjustment range is narrow has a lowest priority.

46. The affected cell base station sends a power adjustment request to the base station requiring interference coordination determined in step 45. For example, the affected cell base station preferentially sends, according to the sorting result in step 45, the power adjustment request to the interfering cell base station with the highest priority.

The content carried by the power adjustment request information may be a relative amplitude value expected by the affected cell base station for power adjustment of the interfering cell base station (that is, an adjustment amplitude relative to the current transmit power of the interfering cell base station), or may be an absolute amplitude value expected by affected cell base station for power adjustment of the interfering cell base station (that is, a transmit power value expected by the affected cell base station for the interfering cell base station). The power adjustment request information may be indicated by a method similar to that used to indicate the power adjustment range information, which is not described herein again.

In addition, the affected cell base station may send Load indication information to the interfering cell base station, where the power adjustment request is carried in the Load indication information. The power adjustment request may be transmitted to the interfering cell base station over an interface such as an X2 interface, an S1 interface, or an air interface.

47. After receiving the power adjustment request sent by the affected cell base station, the interfering cell base station adjusts a transmit power on the ABS resource according to the power adjustment request. For example, the interfering cell base station adjusts the transmit power on the ABS resource within the power adjustment range allowed by the base station.

It should be noted that the power coordination process between the base stations may be an iterative (that is, recurring and repeating) process. The interfering cell base station may perform power coordination with the affected cell base station multiple times, which ensures reliable service transmission for the affected cell base station on the ABS resource while ensuring the minimum transmit power of the interfering cell base station on the ABS resource.

Figure 5:
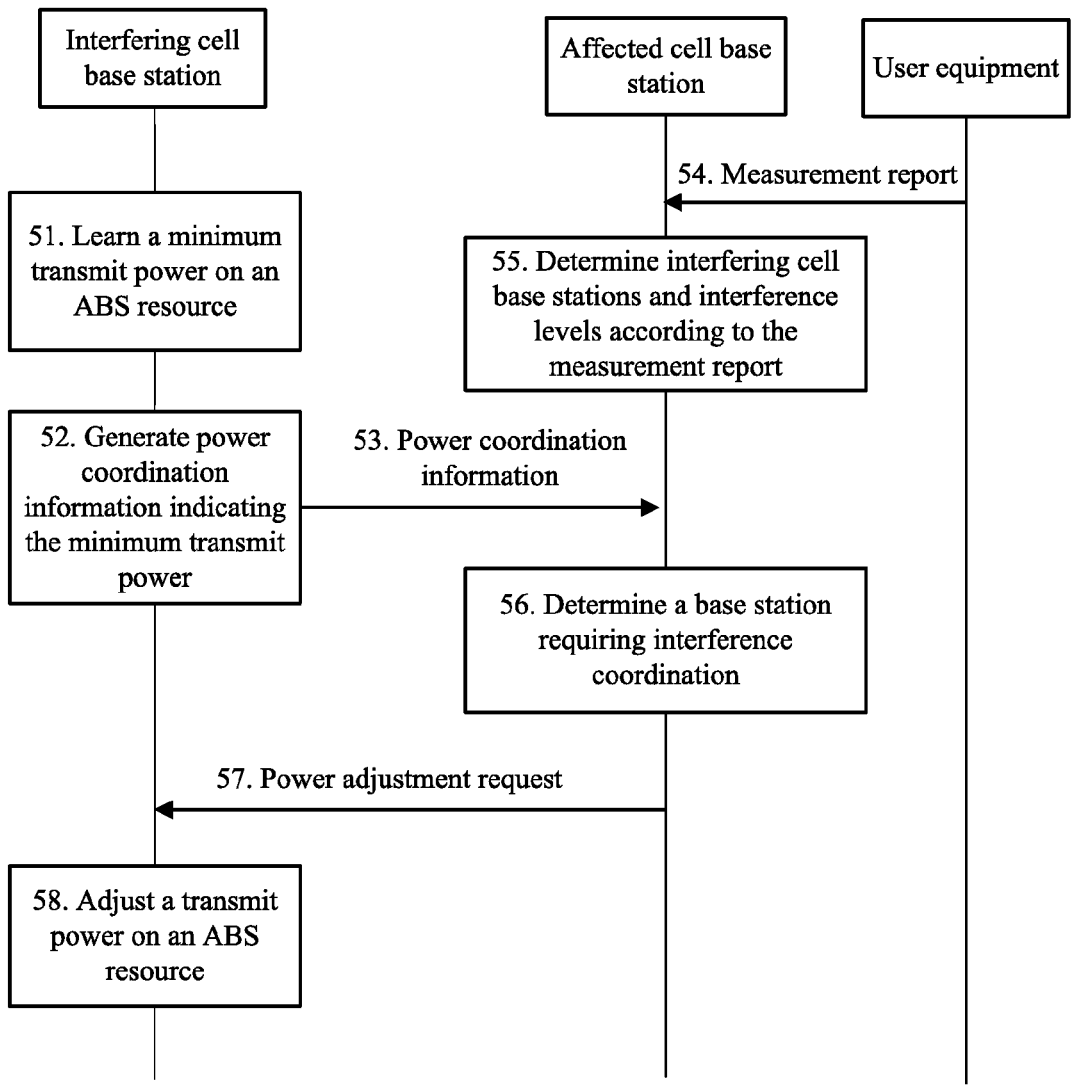
FIG. 5 is a schematic flowchart of an interference coordination process according to another embodiment of the present invention.

FIG. 5 is a schematic flowchart of an interference coordination process according to another embodiment of the present invention. In the embodiment in FIG. 5, power coordination information is used to indicate a minimum transmit power of an interfering cell base station on a specific channel resource.

51. An interfering cell base station determines a minimum transmit power on an ABS resource.

The minimum transmit power of the interfering cell base station generally is a value determined at a network planning or network optimization stage, and is configured by the network for the base station. For example, the minimum transmit power may be set according to different coverage ranges of the interfering cell base station and an affected cell base station on different subframe types (ABS resource or non-ABS resource) and a link budget (Link Budget). In addition, the interfering cell base station may also semi-statically adjust the setting of the minimum transmit power on the ABS resource by using a self-organizing network (Self-organizing Network) or self-optimizing network (Self-optimizing Network) mechanism.

52. The interfering cell base station generates power coordination information that includes the minimum transmit power on the ABS resource.

53. The interfering cell base station sends the minimum transmit power information to an affected cell base station. Reference may be made to the description of step 43 for a method for sending the minimum transmit power information, which is not described herein again.

54. The affected cell base station receives a measurement report reported by a user equipment, where the measurement report carries RSRPs and/or RSRQs of neighboring cells measured by the UE of the affected cell base station. In addition, the measurement report further carries current transmit power information of the interfering cell base stations, or carries reference signal received powers of the user equipment and path loss (Pathloss) information between the user equipment and the interfering cell base stations.

55. The affected cell base station determines interfering cell base stations and interference levels of the interfering cell base station according to the measurement report reported by the user equipment. In addition, the affected cell base station obtains the current transmit power information or path loss information of the interfering cell base stations carried in the measurement report. In an embodiment, the user equipment may carry, in the same measurement report, the information (for example, RSRPs and/or RSRQs) for determining the interference levels, and the current transmit power information or path loss information. The user equipment may also send the information for determining the interference level and the current transmit power information or path loss information separately in different measurement reports.

Reference may be made to the description of step 44 for the method for learning interfering cell base stations and interference levels of the interfering cell base stations, which is not described herein again. The current ABS resource transmit power information or path loss information of the interfering cell base station may be learned from the measurement report reported by the user equipment. In this embodiment, the measurement report of the user equipment further needs to include the current ABS resource transmit power information or path loss information (that is, a value of a path loss from the interfering cell base station to the user equipment) of the interfering cell base station. The UE obtains the current ABS resource transmit power or path loss by measuring a pilot signal (that is, a reference signal, for example, a cell-specific reference signal, or a user equipment-specific reference signal, or a demodulation reference signal, or a channel state information reference signal) of the interfering cell base station or by reading system information. The current ABS resource transmit power information or path loss information may be indicated by using a method similar to that described in step 43, which is not described herein again.

56. The affected cell base station determines a base station requiring interference adjustment according to the power coordination information (where in this example, the power coordination information is the minimum transmit power information) received in step 53, the interference levels of the interfering cell base stations determined in step 55, and the current ABS resource transmit power information or path loss information of the interfering cell base stations.

The affected cell base station obtains the power adjustment range information of the interfering base stations according to the learned current ABS resource transmit power information and minimum transmit power information of the interfering cell base stations. That is, a power adjustment range is equal to a difference between a current ABS resource transmit power and a minimum transmit power information. After determining power adjustment ranges of the interfering cell base stations, the affected cell base station may determine the base station requiring interference coordination according to a method similar to that described in step 45, which is not described herein again.

Alternatively, the affected cell base station obtains the power adjustment range information according to the minimum transmit power information, the reference signal received powers of the user equipment, and the path loss information between the user equipment and the interfering cell base stations. The affected cell base station (that is, the serving base station of the user equipment) uses a sum of the path loss and reference signal received power of the user equipment as the current transmit power of an interfering cell base station of the user equipment. In this case, the power adjustment range is equal to a difference between the current transmit power and the minimum transmit power information. After determining power adjustment ranges of the interfering cell base stations, the affected cell base station may determine the base station requiring interference coordination according to a method similar to that described in step 45, which is not described herein again.

57. The affected cell base station sends a power adjustment request to the base station requiring interference coordination determined in step 55. Reference may be made to the description of step 46 for the sending method in step 57, which is not described herein again.

58. After receiving the power adjustment request sent by the affected cell base station, the interfering cell base station adjusts a transmit power on the ABS resource according to the power adjustment request. Reference may be made to the description of step 47 for the method for transmit power adjustment, which is not described herein again.

It should be noted that the power coordination process between the base stations may be an iterative (that is, recurring and repeating) process. The interfering cell base station may perform power coordination with the affected cell base station multiple times, which ensures reliable service transmission for the affected cell base station on the ABS resource while ensuring the minimum transmit power of the interfering cell base station on the ABS resource.

Therefore, according to the embodiment of the present invention, the interfering cell base station can still use the ABS resource for service transmission for a UE thereof while reducing interference to the affected cell base station, thereby increasing system capacity.

Figure 6:
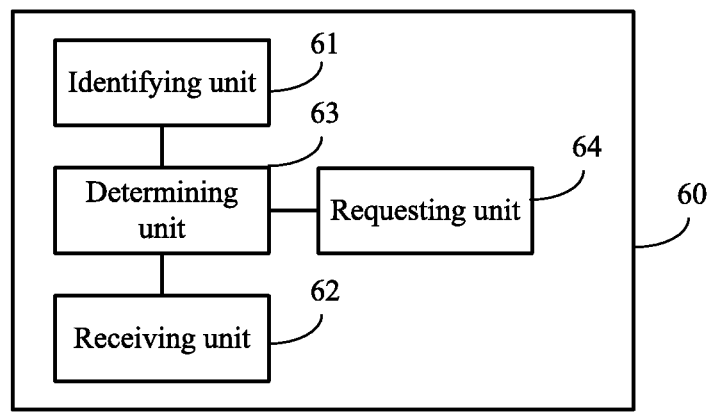
FIG. 6 is a block diagram of a base station according to an embodiment of the present invention.

FIG. 6 is a block diagram of a base station device according to an embodiment of the present invention. The base station 60 in FIG. 6 includes an identifying unit 61, a receiving unit 62, a determining unit 63, and a requesting unit 64.

The identifying unit 61 learns interfering cell base stations and interference levels of the interfering cell base stations. The receiving unit 62 receives power coordination information sent by the interfering cell base stations, where the power coordination information is used to indicate a power headroom of an interfering cell base station on a specific channel resource or indicate a minimum transmit power of an interfering cell base station on a specific channel resource. The determining unit 63 determines, based on the interference levels of the interfering cell base stations determined by the identifying unit 61 and the power coordination information received by the receiving unit 62, a base station requiring interference coordination among the interfering cell base stations. The requesting unit 64 sends a power adjustment request to the base station requiring interference coordination so that the base station requiring interference coordination adjusts a transmit power on the specific channel resource.

In the embodiment of the present invention, an interfering cell base station sends power coordination information of a specific channel resource to an affected cell base station, and adjusts a transmit power on the specific channel resource based on an adjustment request generated by the affected cell base station based on the power coordination information, thereby reducing interference to the affected cell base station on the specific channel resource; and meanwhile, the interfering cell base station can still use the specific channel resource for service transmission, which increases system capacity.

An example of the base station 60 in FIG. 6 is the affected cell base station in FIG. 4 or FIG. 5, and the base station 60 performs corresponding operations of the affected cell base station.

For example, when the power coordination information received by the receiving unit 62 is used to indicate a power headroom of an interfering cell base station on a specific channel resource, the power headroom includes a difference between a current transmit power and a minimum transmit power of the interfering cell base station on the specific channel resource. In this case, the determining unit 63 sorts interfering cell base stations according to the interference levels and power headrooms of the interfering cell base stations, and determines the base station requiring interference coordination according to a sorting result.

For example, when the power coordination information received by the receiving unit 62 is used to indicate a minimum transmit power of an interfering cell base station on a specific channel resource, the receiving unit 62 is further configured to receive current transmit power information of the interfering cell base stations on the specific channel resource from a user equipment, or receive, from a user equipment, reference signal received powers of the user equipment and path loss information between the user equipment and the interfering cell base stations. The determining unit 63 obtains power adjustment range information of the interfering cell base stations according to the minimum transmit power information and current transmit power information received by the receiving unit 62, or obtains the power adjustment range information of the interfering cell base stations according to the minimum transmit power information, received powers, and path loss information received by the receiving unit 62; sorts the interfering cell base stations by priority according to the interference levels and power adjustment range information of the interfering cell base stations; and determines the base station requiring interference coordination according to a priority sorting result.

The specific channel resource may be an ABS resource. A granularity used for the ABS resource may be a total frequency band on the ABS subframe, or a finer granularity may be used. The requesting unit 64 can enable the base station requiring interference coordination to adjust a transmit power on the ABS resource, a transmit power on a frequency domain subcarrier occupied by the ABS resource, a transmit power on a frequency domain physical resource block occupied by the ABS resource, or a transmit power on a frequency domain resource block group occupied by the ABS resource.

The requesting unit 64 may send load indication information to the base station requiring interference coordination, where the power adjustment request is carried in the load indication information.

Figure 7:
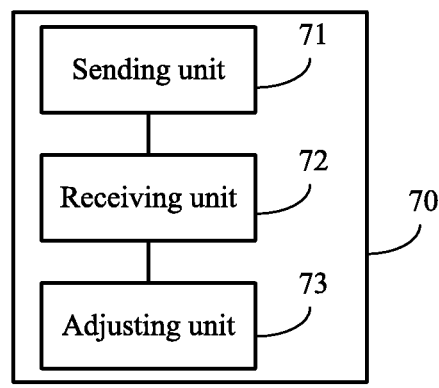
FIG. 7 is a block diagram of a base station according to another embodiment of the present invention.

FIG. 7 is a block diagram of a base station device according to another embodiment of the present invention. A base station 70 in FIG. 7 includes a sending unit 71, a receiving unit 72, and an adjusting unit 73.

The sending unit 71 sends power coordination information to a neighboring cell base station, where the power coordination information is used to indicate a power headroom of the base station 70 on a specific channel resource or indicate a minimum transmit power of the base station 70 on a specific channel resource. The receiving unit 72 receives a power adjustment request sent by the neighboring cell base station according to the power coordination information. The adjusting unit 73 adjusts a transmit power on the specific channel resource according to the power adjustment request received by the receiving unit 72.

In the embodiment of the present invention, an interfering cell base station sends power coordination information of a specific channel resource to an affected cell base station, and adjusts a transmit power on the specific channel resource based on an adjustment request generated by the affected cell base station based on the power coordination information, thereby reducing interference to the affected cell base station on the specific channel resource; and meanwhile, the interfering cell base station can still use the specific channel resource for service transmission, which increases system capacity.

An example of the base station 70 in FIG. 7 is the interfering cell base station in FIG. 4 or FIG. 5, and the base station 70 performs corresponding operations of the interfering cell base station.

Figure 8:
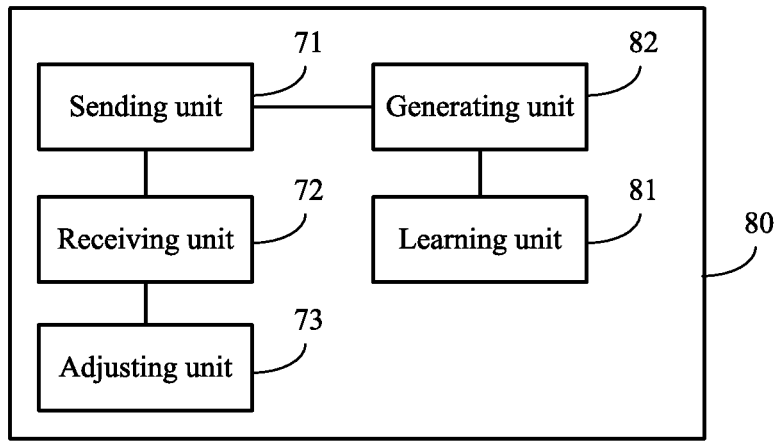
FIG. 8 is a block diagram of a base station according to another embodiment of the present invention.

FIG. 8 is a block diagram of a base station according to another embodiment of the present invention. A base station 80 in FIG. 8 includes the sending unit 71, the receiving unit 72, and the adjusting unit 73 illustrated in FIG. 7. In addition, the base station 80 further includes a learning unit 81 and a generating unit 82.

When the power coordination information sent by the sending unit 71 is used to indicate a power headroom of the interfering cell base station on a specific channel resource, the power headroom of the interfering cell base station on the specific channel resource includes a difference between a current transmit power and a minimum transmit power of the interfering cell base station on the specific channel resource. In this case, the learning unit 81 learns the current transmit power and the minimum transmit power on the specific channel resource. The generating unit 82 obtains the difference between the current transmit power and the minimum transmit power on the specific channel resource as the power headroom, and generates power coordination information indicating the power headroom.

According to another embodiment of the present invention, when the power coordination information sent by the sending unit 71 is used to indicate a minimum transmit power of the interfering cell base station on a specific channel resource, the learning unit 81 learns the minimum transmit power on the specific channel resource. The generating unit 82 generates power coordination information used to indicate the minimum transmit power on the specific channel resource.

The specific channel resource may be an ABS resource. A granularity used for the ABS resource may be a total frequency band on the ABS subframe, or a finer granularity may be used. The adjusting unit 73 may adjust, according to the power adjustment request, a transmit power on the ABS resource, a transmit power on a frequency domain subcarrier occupied by the ABS resource, a transmit power on a frequency domain physical resource block occupied by the ABS resource, or a transmit power on a frequency domain resource block group occupied by the ABS resource.

The sending unit 71 may send load indication information to the neighboring cell base station, where the power coordination information is carried in the load indication information.

Figure 9:
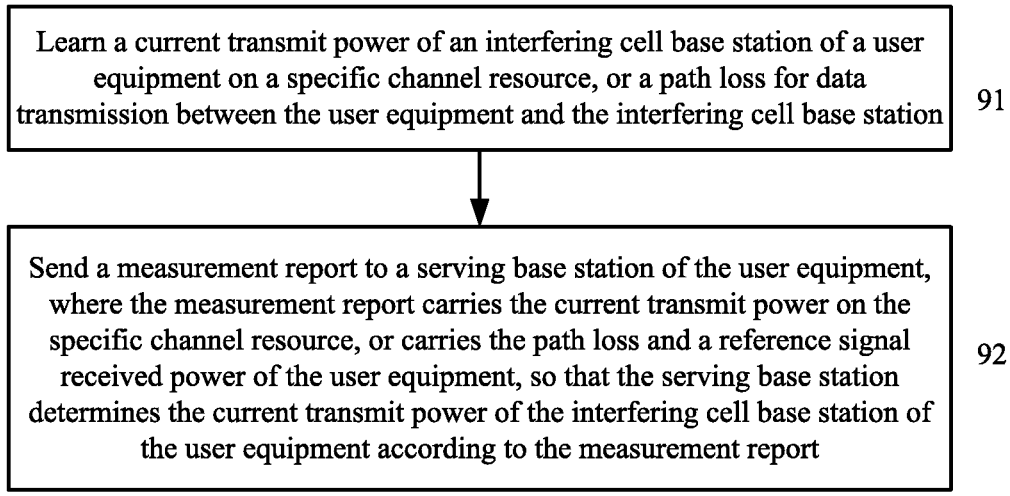
FIG. 9 is a schematic flowchart of a method for sending a measurement report according to an embodiment of the present invention.

FIG. 9 is a schematic flowchart of a method for sending a measurement report according to an embodiment of the present invention. The method in FIG. 9 is executed by a user equipment.

91. Learn a current transmit power of an interfering cell base station of a user equipment on a specific channel resource, or a path loss for data transmission between the user equipment and the interfering cell base station.

92. Send a measurement report to a serving base station of the user equipment, where the measurement report carries the current transmit power on the specific channel resource, or the measurement report carries the path loss and a reference signal received power of the user equipment, so that the serving base station determines the current transmit power of the interfering cell base station of the user equipment according to the measurement report.

The method in FIG. 9 may be applied to the embodiment (step 54) in FIG. 5 to report the current transmit power or path loss of the interfering cell base station on the ABS resource to the affected cell base station, so that the affected cell base station can obtain, according to the current transmit power or path loss on the ABS resource reported by the user equipment in combination with minimum transmit power information received by the affected cell base station from the interfering cell base station, the current transmit power of the interfering cell base station on the ABS resource. In this way, the affected cell base station can obtain a power adjustment range of the interfering cell base station on the ABS resource, generate a power adjustment request according to the power adjustment range, and request the interfering cell base station to adjust the transmit power on the ABS resource.

Optionally, in an embodiment, when the measurement report carries the path loss information and the reference signal received power of the user equipment, the serving base station uses a sum of the path loss information and the reference signal received power of the user equipment as the current transmit power of the interfering cell base station of the user equipment.

Figure 10:
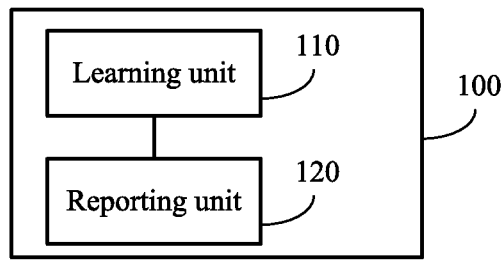
FIG. 10 is a schematic block diagram of a user equipment according to an embodiment of the present invention.

FIG. 10 is a schematic block diagram of a user equipment according to an embodiment of the present invention. The user equipment 100 in FIG. 10 includes a learning unit 110 and a reporting unit 120.

The learning unit 110 learns a current transmit power of an interfering cell base station of the user equipment 100 on a specific channel resource, or a path loss for data transmission between the user equipment 100 and the interfering cell base station. The reporting unit 120 sends a measurement report to a serving base station of the user equipment 100, where the measurement report carries the current transmit power learned by the learning unit 110 on the specific channel resource, or the measurement report carries the path loss learned by the learning unit 110 and a reference signal received power of the user equipment 100, so that the serving base station determines the current transmit power of the interfering cell base station of the user equipment 100 according to the measurement report.

The user equipment 100 in FIG. 10 may be applied to the embodiment (step 54) in FIG. 5 to report the current transmit power or path loss of the interfering cell base station on the ABS resource to the affected cell base station, so that the affected cell base station can obtain, according to the current transmit power or path loss on the ABS resource reported by the user equipment in combination with minimum transmit power information received by the affected cell base station from the interfering cell base station, the current transmit power of the interfering cell base station on the ABS resource. In this way, the affected cell base station can obtain a power adjustment range of the interfering cell base station on the ABS resource, generate a power adjustment request according to the power adjustment range, and request the interfering cell base station to adjust the transmit power on the ABS resource.

The learning unit 110 may further learn an RSRP and/or RSRQ of the interfering cell base station; and the reporting unit 120 may carry, in the same measurement report, information (for example, the RSRP and/or RSRQ) for determining an interference level, and the current transmit power information or path loss information. The user equipment may also send the information (for example, the RSRP and/or RSRQ) for determining the interference level and the current transmit power information or path loss information separately in different measurement reports.

In the embodiment of the present invention, power coordination information is used to indicate a power headroom or a minimum transmit power of an interfering cell base station on a specific channel resource. According to another embodiment of the present invention, the power coordination information may also be a power headroom of another device (for example, a user equipment or a terminal) on a specific channel resource and/or resource indication information of the specific channel resource.

Figure 11:
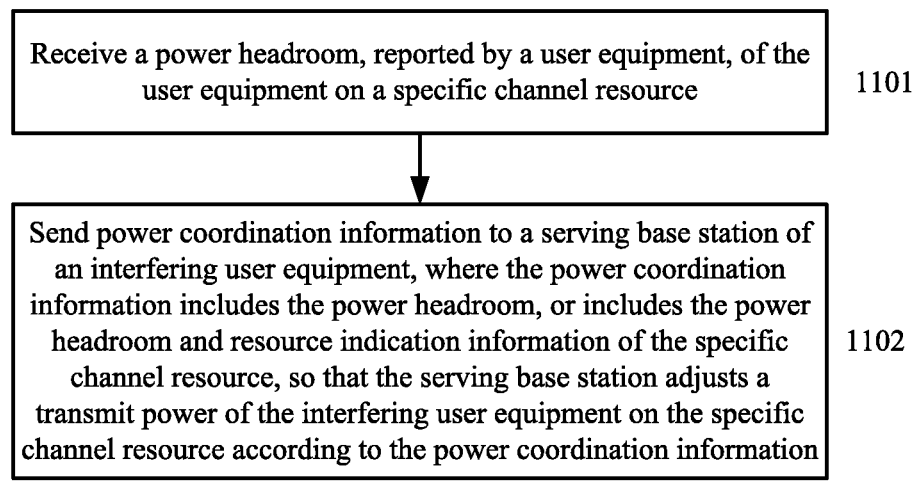
FIG. 11 is a schematic flowchart of an interference coordination method according to another embodiment of the present invention.

FIG. 11 is a schematic flowchart of an interference coordination method according to another embodiment of the present invention. The method in FIG. 11 is executed by a base station (a base station of an affected user equipment).

1101. Receive a power headroom, reported by a user equipment, of the user equipment on a specific channel resource. In this case, the user equipment may carry the power headroom in a reported measurement report.

1102. Send power coordination information to a serving base station of an interfering user equipment, where the power coordination information includes the power headroom, or the power coordination information includes the power headroom and resource indication information of the specific channel resource, so that the serving base station adjusts a transmit power of the interfering user equipment on the specific channel resource according to the power coordination information.

In this way, the affected user equipment reports the power headroom to the base station thereof, and the base station sends the power coordination information to the base station of the interfering user equipment, so that the base station of the interfering user equipment can adjust, according to the power coordination information, the transmit power of the interfering user equipment on the specific channel resource, thereby reducing interference between user equipments.

The specific channel resource in this embodiment may be an almost blank subframe ABS resource, or may be a resource on a normal service subframe. For example, the specific channel resource may be a flexible subframe (flexible subframe) resource. The subframe type of a flexible subframe is changeable, and a flexible subframe may be used as an uplink subframe within one period of time while as a downlink subframe within another period of time. A granularity of the specific channel resource may be frame, subframe, timeslot, symbol, physical resource block group, physical resource block, subcarrier, frequency sub-band, or the like.

FIG. 12 is a schematic flowchart of an interference coordination method according to another embodiment of the present invention. The method in FIG. 12 is executed by a second base station (a base station of an interfering user equipment).

1201. A second base station receives power coordination information sent by a first base station, where the power coordination information is generated by the first base station according to a power headroom, reported by a user equipment of the first base station, on a specific channel resource, and includes the power headroom, or includes the power headroom and resource indication information of the specific channel resource, and a user equipment of the second base station causes interference to the user equipment of the first base station on the specific channel resource.

1202. The second base station adjusts, according to the power coordination information, a transmit power of the user equipment of the second base station on the specific channel resource.

In this way, the affected user equipment reports the power headroom to the base station (the first base station) thereof, and the base station sends the power coordination information to the base station (the second base station) of the interfering user equipment, so that the base station of the interfering user equipment can adjust, according to the power coordination information, the transmit power of the interfering user equipment on the specific channel resource, thereby reducing interference between user equipments.

The specific channel resource in this embodiment may be an almost blank subframe ABS resource, or may be a resource on a normal service subframe. For example, the specific channel resource may be a flexible subframe (flexible subframe) resource. The subframe type of a flexible subframe is changeable, and a flexible subframe may be used as an uplink subframe within one period of time while as a downlink subframe within another period of time. A granularity of the specific channel resource may be frame, subframe, timeslot, symbol, physical resource block group, physical resource block, subcarrier, frequency sub-band, or the like.

FIG. 13 is a schematic flowchart of an interference coordination process according to another embodiment of the present invention. In FIG. 13, UE1 is a user equipment served by a first base station, UE2 is a user equipment served by a second base station, and it is assumed that UE2 causes interference to UE1 on a specific channel resource.

131. The user equipment UE1 of the first base station reports a power headroom (Power Headroom) of UE1 on the specific channel resource.

The user equipment UE1 may carry the power headroom in a reported measurement report. A wider range represented by the power headroom indicates that the user equipment UE1 has a wider power adjustment range. On the contrary, a narrower range represented by the power headroom indicates that the user equipment UE1 has a narrower power adjustment range. Normally, in order to ensure reliable service transmission, a transmit power is increased for a user equipment UE1 at a cell edge or a user equipment UE1 receiving strong interference. Therefore, the power adjustment ranges reported by such user equipments are normally narrow.

For example, the power headroom may include a difference between a current transmit power and a minimum transmit power of the user equipment UE1 on the specific channel resource. The power headroom may be indicated by a method similar to that used to indicate the power adjustment range information in step 42 in FIG. 4, which is not described herein again.

132. After receiving the power headroom reported by the user equipment UE1, the first base station generates power coordination information according to the power headroom.

The power coordination information includes the power headroom, or includes the power headroom and resource indication information of the specific channel resource.

When the power coordination information is generated, factors such as a range represented by the power headroom of the user equipment and/or the interference received by the user equipment may be considered comprehensively.

For example, when the power headroom reported by the user equipment represents a narrow range, it indicates that a transmit power of the user equipment is very close to a maximum allowed transmit power. In this case, interference protection is needed to improve transmission reliability for the user equipment.

133. The first base station transmits the power coordination information to the second base station.

The first base station determines, according to location information of the user equipment UE1, location information of the second base station, measurement information of the user equipment UE1, and/or measurement information of the first base station, a user equipment UE2 of which base station causes strong interference to the user equipment UE1, and transmits the power coordination information to the base station (that is, the second base station) of the interfering user equipment UE2.

134. The second base station receives the power coordination information transmitted by the first base station, and adjusts a transmit power of the user equipment UE2 of the second base station on the specific channel resource according to the received power coordination information, thereby reducing interference to the user equipment UE1 of the first base station.

For example, when the power coordination information includes a power headroom, a narrower range represented by the power headroom indicates greater urgency of interference protection for the user equipment of the first base station. The second base station may correspondingly adjust, according to the range represented by the power headroom, the transmit power of the user equipment UE2. That is, a narrower range represented by the power headroom indicates a higher amplitude of adjustment made by the second base station to the transmit power of the user equipment UE2. For example, in this case, the second base station may adjust transmit powers of all user equipments served by the second base station on all channel resources, so as to adjust the transmit power of UE2.

Alternatively, if the power coordination information includes resource indication information of the specific channel resource, the second base station may reduce a transmit power of the user equipment UE2 on the specific channel resource indicated by the resource indication information, thereby reducing interference to the user equipment UE1 of the first base station.

When the power coordination information includes both the resource indication information of the specific channel resource and the power headroom, the second base station correspondingly adjusts, according to the range represented by the power headroom, a transmit power of the user equipment UE2 on the specific channel resource indicated by the resource indication information. For example, in this case, the second base station may adjust transmit powers of all user equipments served by the second base station on the specific channel resource indicated by the resource indication information, so as to adjust the transmit power of UE2.

In addition, this embodiment is an interference protection method specific to service transmission of a user equipment, and the specific channel resource in this embodiment may be an almost blank subframe ABS resource, or may be a resource on a normal service subframe. For example, the specific channel resource may be a flexible subframe (flexible subframe) resource. The subframe type of a flexible subframe is changeable, and a flexible subframe may be used as an uplink subframe within one period of time while as a downlink subframe within another period of time. A granularity of the specific channel resource may be frame, subframe, timeslot, symbol, physical resource block group, physical resource block, subcarrier, frequency sub-band, or the like.

In this way, the affected user equipment reports the power headroom to the base station (the first base station) thereof, and the base station sends the power coordination information to the base station (the second base station) of the interfering user equipment, so that the base station of the interfering user equipment can adjust, according to the power coordination information, the transmit power of the interfering user equipment on the specific channel resource, thereby reducing interference between user equipments.

Figure 14:
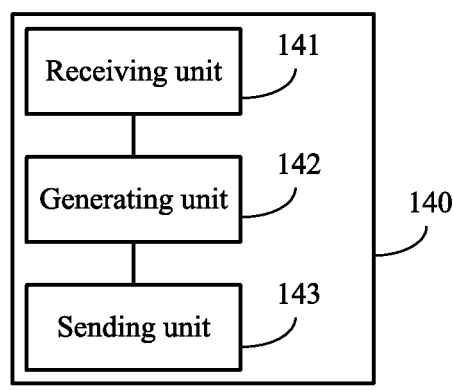
FIG. 14 is a schematic block diagram of a base station according to an embodiment of the present invention.

FIG. 14 is a schematic block diagram of a base station according to an embodiment of the present invention. The base station 140 in FIG. 14 executes the method illustrated in FIG. 11 and performs operations involving the first base station in FIG. 13, and includes a receiving unit 141, a generating unit 142, and a sending unit 143.

The receiving unit 141 receives a power headroom, reported by a user equipment, of the user equipment on a specific channel resource. The generating unit 142 generates power coordination information according to the power headroom, where the power coordination information the power headroom, or the power coordination information includes the power headroom and resource indication information of the specific channel resource. The sending unit 143 sends the power coordination information to a serving base station of an interfering user equipment so that the serving base station adjusts a transmit power of the interfering user equipment on the specific channel resource according to the power coordination information.

The specific channel resource in this embodiment may be an almost blank subframe ABS resource, or may be a resource on a normal service subframe. For example, the specific channel resource may be a flexible subframe (flexible subframe) resource. The subframe type of a flexible subframe is changeable, and a flexible subframe may be used as an uplink subframe within one period of time while as a downlink subframe within another period of time. A granularity of the specific channel resource may be frame, subframe, timeslot, symbol, physical resource block group, physical resource block, subcarrier, frequency sub-band, or the like.

In this way, the affected user equipment reports the power headroom to the base station thereof, and the base station sends the power coordination information to the base station of the interfering user equipment, so that the base station of the interfering user equipment can adjust, according to the power coordination information, the transmit power of the interfering user equipment on the specific channel resource, thereby reducing interference between user equipments.

Figure 15:
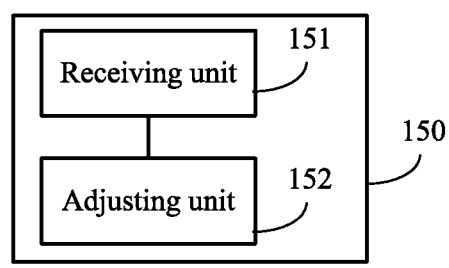
FIG. 15 is a schematic block diagram of a base station according to an embodiment of the present invention.

FIG. 15 is a schematic block diagram of a base station according to an embodiment of the present invention. The base station 150 in FIG. 15 executes the method illustrated in FIG. 12 and performs operations involving the second base station in FIG. 13, and includes a receiving unit 151 and an adjusting unit 152.

The receiving unit 151 receives power coordination information sent by a first base station, where the power coordination information is generated by the first base station according to a power headroom, reported by a user equipment of the first base station, on a specific channel resource, and includes the power headroom or includes the power headroom and resource indication information of the specific channel resource, and a user equipment of the base station 150 causes interference to the user equipment of the first base station on the specific channel resource. The adjusting unit 152 adjusts, according to the power coordination information, a transmit power of the user equipment of the base station 150 on the specific channel resource.

The specific channel resource in this embodiment may be an almost blank subframe ABS resource, or may be a resource on a normal service subframe. For example, the specific channel resource may be a flexible subframe (flexible subframe) resource. The subframe type of a flexible subframe is changeable, and a flexible subframe may be used as an uplink subframe within one period of time while as a downlink subframe within another period of time. A granularity of the specific channel resource may be frame, subframe, timeslot, symbol, physical resource block group, physical resource block, subcarrier, frequency sub-band, or the like.

In this way, the affected user equipment reports the power headroom to the base station thereof, and the base station sends the power coordination information to the base station of the interfering user equipment, so that the base station of the interfering user equipment can adjust, according to the power coordination information, the transmit power of the interfering user equipment on the specific channel resource, thereby reducing interference between user equipments.

A communication system according to an embodiment of the present invention may include the base stations 60-80, 140, and 150, or the user equipment 100.

A person of ordinary skill in the art may appreciate that, in combination with the examples described in the embodiments disclosed in this specification, units and algorithm steps may be implemented by electronic hardware, or a combination of electronic hardware and computer software. In order to clearly describe the interchangeability between the hardware and the software, the foregoing has generally described compositions and steps of the examples according to functions. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to the corresponding process in the foregoing method embodiments, and the details are not described herein again.

In the several embodiments provided in the present application, it should be understood that the disclosed system, apparatus, and method may be implemented in other manners. For example, the described apparatus embodiments are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. A part or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit. The integrated unit may be implemented through hardware, or may also be implemented in a form of hardware plus a software functional unit.

When the integrated unit is implemented in a form of a software functional unit and sold or used as an independent product, the integrated unit may be stored in a computer-readable storage medium. Based on such an understanding, the technical solutions of the present invention essentially, or the part contributing to the prior art, or a part of the technical solutions may be implemented in a form of a software product. The computer software product is stored in a storage medium, and includes several instructions for instructing a computer device (which may be a personal computer, a server, or a network device) to perform all or a part of the steps of the methods described in the embodiments of the present invention. The foregoing storage medium includes: any medium that can store program codes, such as a USB flash disk, a removable hard disk, a read-only memory (ROM), a random access memory (RAM), a magnetic disk, or an optical disk.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. An interference coordination method, comprising:
   determining interfering cell base stations;
   determining interference levels of the interfering cell base stations;
   receiving power coordination information sent by the interfering cell base stations, wherein the power coordination information is used to indicate:
      a power headroom of an interfering cell base station on a specific channel resource, wherein the power headroom of the interfering cell base station on the specific channel resource comprises a difference between a current transmit power and a minimum transmit power of the interfering cell base station on the specific channel resource;
   selecting, by an affected cell base station, one of the interfering cell base stations according to the interference levels and power coordination information of the interfering cell base stations; and
   sending, by the affected cell base station, a power adjustment request to the selected interfering cell base station to request that the selected interfering cell base station adjust a transmit power on the specific channel resource, wherein the specific channel resource is an almost blank subframe (ABS) resource.

2. The method according to claim 1, wherein selecting one of interfering cell base stations according to the interference levels and power coordination information of the interfering cell base stations comprises:
sorting the interfering cell base stations according to the interference levels and power headrooms of the interfering cell base stations; and
selecting one of the interfering cell base stations according to a sorting result.

3. The method according to claim 1, wherein sending the power adjustment request to the selected interfering cell base station comprises sending the power adjustment request to the selected interfering cell base station to request that that the selected interfering cell base station adjust a transmit power on the ABS resource.

4. The method according to claim 1, wherein sending the power adjustment request to the selected interfering cell base station comprises sending the power adjustment request to the selected interfering cell base station requiring interference coordination to request that the selected interfering cell base station adjust a transmit power on a frequency domain subcarrier occupied by the ABS resource.

5. The method according to claim 1, wherein sending the power adjustment request to the selected interfering cell base station comprises sending the power adjustment request to the selected interfering cell base station requiring interference coordination to request that the selected interfering cell base station adjust a transmit power on a frequency domain physical resource block occupied by the ABS resource.

6. The method according to claim 1, wherein sending the power adjustment request to the selected interfering cell base station comprises sending the power adjustment request to the selected interfering cell base station requiring interference coordination to request that the selected interfering cell base station adjust a transmit power on a frequency domain resource block group occupied by the ABS resource.

7. A base station, comprising:
a processor; and
a non-transitory computer readable storage medium storing programming for execution by the processor, the programming including instructions to:
determine interfering cell base stations and interference levels of the interfering cell base stations;
receive power coordination information sent by the interfering cell base stations, wherein the power coordination information is used to indicate:
a power headroom of an interfering cell base station on a specific channel resource, wherein the power headroom of the interfering cell base station on the specific channel resource comprises a difference between a current transmit power and a minimum transmit power of the interfering cell base station on the specific channel resource;
select one of the interfering cell base stations according to the interference levels and power coordination information of the interfering cell base stations based on the interference levels of the interfering cell base stations and the power coordination information; and
send a power adjustment request to the selected interfering cell base station to request that that the selected interfering cell base station adjust a transmit power on the specific channel resource, wherein the specific channel resource is an almost blank subframe (ABS) resource.

8. The base station according to claim 7,
wherein the instructions to determine the base station requiring interference coordination includes instructions to sort the interfering cell base stations according to the interference levels of the interfering cell base stations and the power headrooms, and to determine the base station requiring interference coordination according to a sorting result.

9. The base station according to claim 7, wherein sending the power adjustment request to the base station requiring interference coordination prompts the base station to adjust a transmit power on the ABS resource.

10. The base station according to claim 7, wherein sending the power adjustment request to the base station requiring interference coordination prompts the base station to adjust a transmit power on a frequency domain subcarrier occupied by the ABS resource.

11. The base station according to claim 7, wherein sending the power adjustment request to the base station requiring interference coordination prompts the base station to adjust a transmit power on a frequency domain physical resource block occupied by the ABS resource.

12. The base station according to claim 7, wherein sending the power adjustment request to the base station requiring interference coordination prompts the base station to adjust a transmit power on a frequency domain resource block group occupied by the ABS resource.

* * * * *